(12) United States Patent  (10) Patent No.: US 7,861,829 B1
Coursey  (45) Date of Patent: Jan. 4, 2011

(54) PAYOUT MECHANISM FOR ADVANCING SCREEN SPLINE USING A SPOOL HOLDER AND METHOD FOR ITS USE

(76) Inventor: Mark Anthony Coursey, 304 Reeves St., Unit B-23, Niceville, FL (US) 32578

( * ) Notice: Subject to any disclaimer, the term of this patent is extended or adjusted under 35 U.S.C. 154(b) by 1029 days.

(21) Appl. No.: 11/541,109

(22) Filed: Oct. 2, 2006

(51) Int. Cl.
*B60T 1/00* (2006.01)
(52) U.S. Cl. ........................................................ 188/31
(58) Field of Classification Search ............... 188/30, 188/31; 242/139, 588.1, 588.2, 156
See application file for complete search history.

(56) References Cited

U.S. PATENT DOCUMENTS

| | | | | | |
|---|---|---|---|---|---|
| 351,427 | A | * | 10/1886 | Danelius | 225/77 |
| 447,496 | A | * | 3/1891 | Slade | 242/156 |
| 492,975 | A | * | 3/1893 | Streeter | 225/69 |
| 2,217,260 | A | * | 10/1940 | Speziale | 242/139 |
| 3,150,769 | A | * | 9/1964 | Cohn | 242/137 |
| 3,856,230 | A | * | 12/1974 | Zimmer | 242/422.8 |
| 4,012,010 | A | * | 3/1977 | Friedman | 242/129.8 |
| 4,124,176 | A | * | 11/1978 | Carlson et al. | 242/421.8 |
| 4,494,710 | A | * | 1/1985 | Harris et al. | 242/156 |
| 4,783,017 | A | * | 11/1988 | Ovitz et al. | 242/423.1 |
| 5,551,647 | A | * | 9/1996 | Browning | 242/578.2 |
| 5,584,962 | A | * | 12/1996 | Bradshaw et al. | 156/495 |
| 5,887,819 | A | * | 3/1999 | Korn et al. | 242/599.3 |
| 6,276,623 | B1 | * | 8/2001 | Williams | 242/171 |

* cited by examiner

*Primary Examiner*—Xuan Lan Nguyen
(74) *Attorney, Agent, or Firm*—Peter Loffler

(57) ABSTRACT

A payout mechanism for spline used for attaching screen mesh to a frame uses a base member with a pair of upright standards, each standard having a downwardly extending channel. A spool with a length of spline wound thereabout has an axle passing through its hollow core with the axle being received within the channels. An end of the spline is grasped and whenever a pulling force is exerted on the spline, the spool rotates about the axle paying out additional spline. A brake mechanism located on one of the standards can be used to slow or even stop rotation of the spool while a post with a notch extending upwardly from the base can be used to frictionally hold an end of the spline between jobs.

12 Claims, 3 Drawing Sheets

PAYOUT MECHANISM FOR ADVANCING SCREEN SPLINE USING A SPOOL HOLDER AND METHOD FOR ITS USE

BACKGROUND OF THE INVENTION

1. Field of the Invention

The present invention relates to a system and method that feeds spline to a worker on demand without the need for the worker to attend to the mechanism and the mechanism helps prevent the spline from becoming entangled or otherwise unworkable during field installation of the spline, the method relying on the use of a spooling system that holds and pays out the spline.

2. Background of the Prior Art

Screen spline is a thin elongate flexible member, often made from rubber or neoprene, that is received within an appropriate receiving groove on a screen frame in order to hold the screen mesh securely on the screen frame. Generally, the spline receiving groove completely encircles the frame and is located just beyond the outer periphery of the opening for the screen mesh thereby allowing the spline to hold the screen mesh on all sides in order to prevent gaps which gaps would make the screen less attractive, make the screen more prone to failure, and would provide an opening for insects to ingress into the location for which the screen is being used to defend. A screen installer positions a section of screen mesh so that the mesh completely covers the opening which the mesh is protecting and also overlies the spline receiving groove. Thereafter, a free end of spline is positioned into the receiver and additional spline is progressively inlaid into the receiver typically aided by a spline installing tool which is a hand-held device that has a roller on one or both ends, the roller pushing the spline into the groove so that the spline snugly holds the screen within the groove. This process continues until the worker completely encircles the opening of the frame with the spline and comes back to the initial free end of the spline at which point the spline is cut creating a second free end which is positioned within the groove so that is closely abuts the first free end thereby forming a continuous loop of spline. This gives a solid attachment of screen mesh to screen frame.

Typically, spline comes on spools, at least for commercial users of spline. A worker brings the spool to the point of work and either unravels a sufficient amount of the spline for the job at hand or unravels small amounts of the spline and further unravels more spline as more spline is needed. Each of these methods suffers from certain shortcomings. If the worker unravels the spline, which unraveling may total 20 feet or more for screen doors or large windows, the spline is usually allowed to drop to the ground. When positioned on the ground, the spline is subject to damage from various elements including being cut on job site debris, being crimped from being stepped on or otherwise pinched, etc. If the spline is cut, then the loose end generally must be discarded as most screen installers prefer to use a single section of spline per screen frame and many contractors and homeowners require it. If the spline is crimped sufficiently, then the crimped portion must be cut away and again the loose end of the spline must be discarded. Each of these results in wasted material and time delays. For workers that desire to avoid the potential for waste and who prefer to unravel small sections of spline as the spline is needed, such workers either place the spline spool on a work surface, such as a table or bench, and either push the spool along as more spline is needed or unwind the spline with their free hand. Those workers who place the spline spool on the ground typically push the spool with their foot to unravel more spline. Either method requires to worker to turn way from the spline insertion task in order to retrieve more spline, thereby slowing the installation process. Additionally, the worker runs the risk of the spool rolling away and unraveling a large amount of spline which may become tangled or otherwise damaged requiring that some spline be cut away and discarded.

Accordingly, there exists a need in the art for a system whereby spline is available on demand to a worker installing the spline into the receiving groove of a screen frame, which system address the above stated problems in the art. Specifically, such a system must allow a worker to have spline readily available whenever the spline is needed without the need to turn away from the actual installation or otherwise to take time away from the installation of the spline into the spline groove. Such a system must minimize the risk of damage to the spline so as to not waste spline. Ideally, such any devices used with system should be of simple and straightforward construction and be easy to use and maintain.

SUMMARY OF THE INVENTION

The payout mechanism for advancing screen spline using a spool holder and method for its use of the present invention address the aforementioned needs in the art by providing a device that assists a worker in paying spline out quickly and easily and having the spline available when needed without the need for the worker to constantly turn away from the actual installation of the spline within the spline groove and without the need for the worker to spend time-consuming energy using the payout system. The payout mechanism for advancing screen spline using a spool holder and method for its use minimize the risk of spline becoming pinched or otherwise damaged after being paid out from the spool but before being installed as well as minimize the risk of a runaway spline payout. The payout mechanism for advancing screen spline using a spool holder and method for its use are quick and easy to employ and the payout mechanism, used to implement the method, is of relatively simple design and construction making the device relatively inexpensive to manufacture.

The payout mechanism for advancing screen spline using a spool holder and method for its use of the present invention is comprised of providing a payout mechanism that has a base and a pair of upright and coextensive standards extending upwardly from the base. Each standard has a channel disposed therein such that the channel on one standard is parallel with and facing the channel on the other standard. A spool having a pair of end plates joined by a hollow core is provided such that the spool has a length of the spline wound thereabout. An axle is provided and is impaled through the hollow core and received within the channels of the standard. Whenever a pulling force is exerted on the spline, the spool rotates about the axle and thereby pays out a portion of the spline from the spool. A carrying handle extends between the pair of standards. A post has a notch and extends upwardly from the base and frictionally receives a portion of the spline within the notch in order to hold the spline within the notch. Each channel has an opening that narrowly tapers into a neck portion and thereafter expands into a bulbous end such that the axle rests within the bulbous end of each channel. A brake mechanism is attached to one of the standards such that the brake mechanism retards rotation of the spool about the axle when engaged. The brake mechanism comprises a brake pad that has a shaft extending therefrom with the shaft threadably passing through the standard upon which the brake mechanism is located. A knob is located on the shaft such that rotation of the knob causes the brake pad to advance toward an end plate of the spool and frictionally engage this end plate and counterrotation of the knob causes the brake pad to retreat away from this end plate.

BRIEF DESCRIPTION OF THE DRAWINGS

Similar reference numerals refer to similar parts throughout the several views of the drawings.

DESCRIPTION OF THE PREFERRED EMBODIMENT

Figure 1:
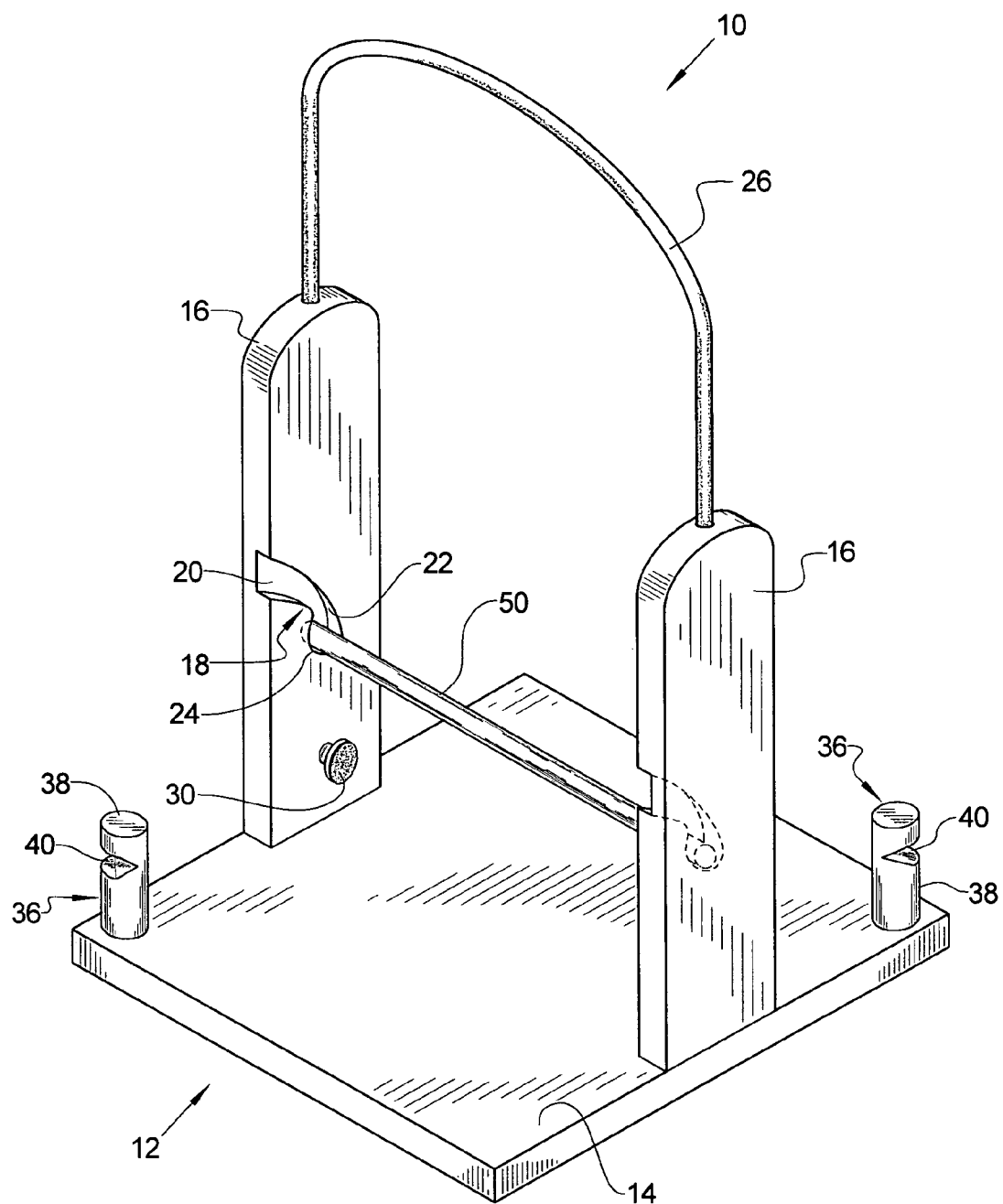
FIG. 1 is a perspective view of the payout mechanism for advancing screen spline using a spool holder and method for its use of the present invention.
Figure 2:
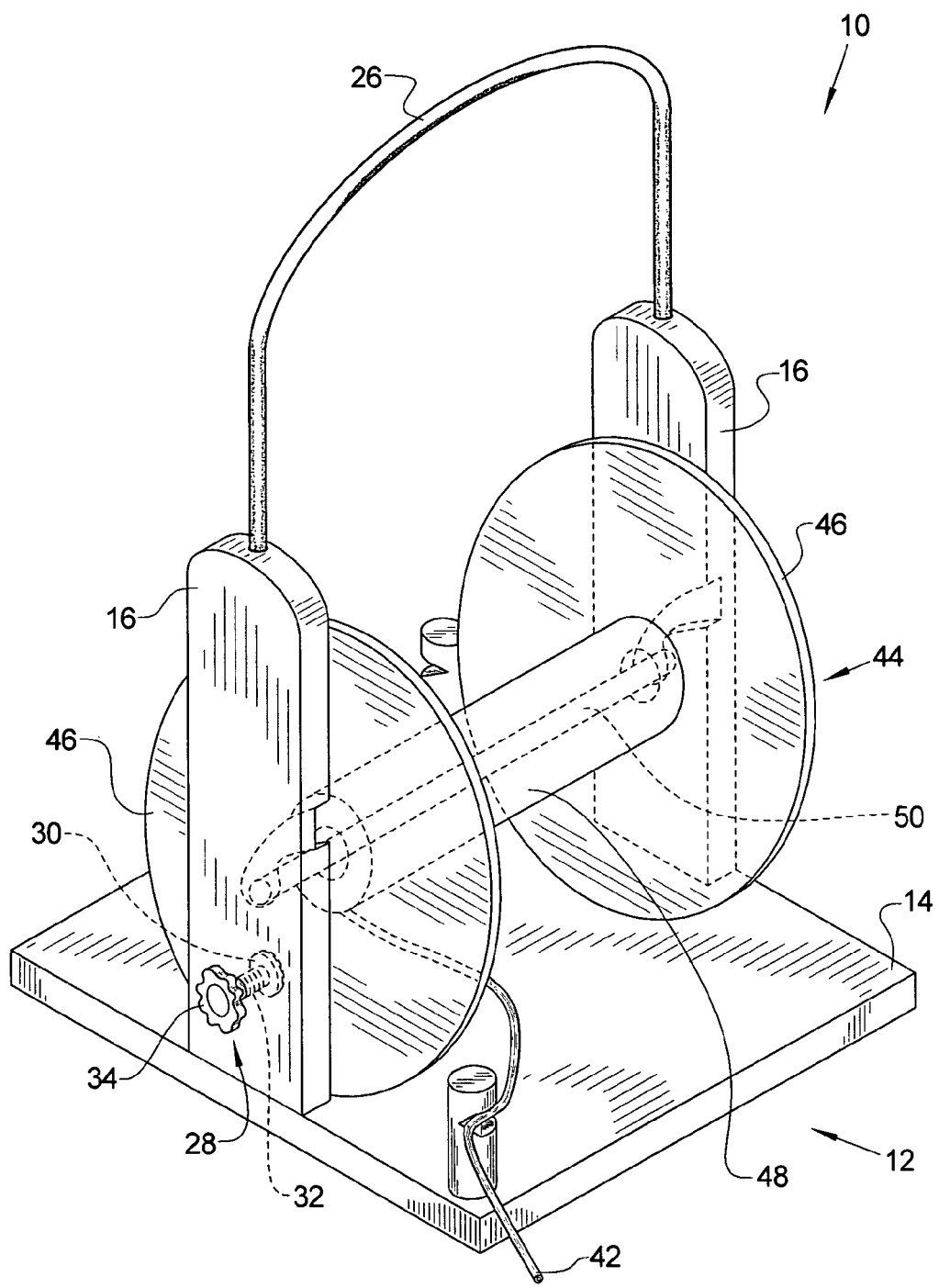
FIG. 2 is a perspective view of the payout mechanism for advancing screen spline using a spool holder and method for its use with a spline spool thereon.
Figure 3:
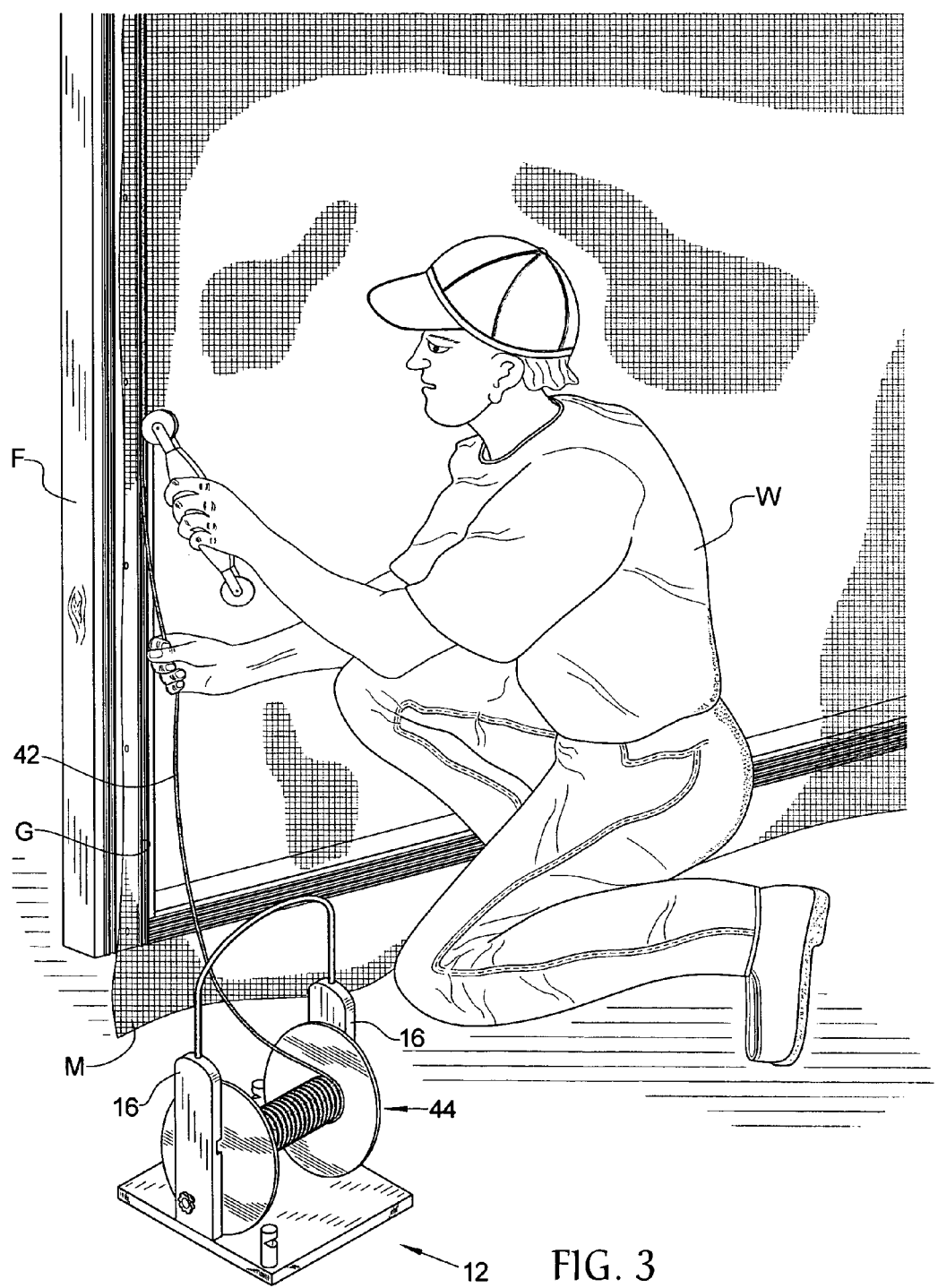
FIG. 3 is a perspective view of the payout mechanism for advancing screen spline using a spool holder and method for its use being used to install spline.

Referring now to the drawings, it is seen that payout mechanism for advancing screen spline using a spool holder and method for its use of the present invention, generally denoted by reference numeral 10, comprises a payout mechanism 12 that has a base 14 from which a pair of parallel standards 16 extend upwardly in coextensive fashion. As seen, each standard 16 had a downwardly extending channel 18 that has a relatively wide opening 20 that tapers to a relatively narrow neck 22 before terminating in a bulbous end 24. The channels 18 on each standard 16 face each other and are parallel with one another. A carrying handle 26 extends between the two upright standards 16. A braking mechanism 28 is located on at least one of the standards 16 and comprises a brake pad 30 that has a shaft 32 extending from the non-braking surface of the brake pad 30, the shaft 32 threadably passing through the standard 16 upon which the braking mechanism 28 is located. A turn knob 34 is located on the opposing end of the shaft 32. Rotation of the knob 34 causes the brake pad 30 to threadably advance toward the opposing standard 16 while counterrotation of the knob 34 causes the brake pad 30 to retreat away from the opposing standard 16.

One or more spline retainers 36 are located on the base 14 and each comprises a post 38 that has a tapered notch 40 thereon. If more than one spline retainer 36 is utilized, then the notch 40 on each post 38 is of a different size in order to accommodate different sizes of spline 42 that may be used with the payout mechanism 12.

The spline 42 comes wound about a spool 44 that has a pair of end plates 46 that are connected by a central hollow core 48. An axle 50 is placed through the hollow core 48 and the ends of the axle 50 are each positioned into a respective one of the channels 18 on the standard 16 and the axle 50 and the spool 44 that is impaled by the axle 50 are slid down into the channel 18 until arriving in the bulbous end 24. The ends of the axle 50 are free to rotate within their respective bulbous end 24.

In order to use the payout mechanism for advancing screen spline using a spool holder and method for its use 10, a spool 44 with the desired size and type of spline 42 is provided and the core 48 of the spool 44 is impaled by the axle 50. The axle 50 is slid into the channels 18 of each standard 16 until the ends of the axle 50 reach their respective bulbous ends 24 of the channel 18. The free end of the spline 42 is grasped by the worker W and the spline 42 is installed within the spline groove G within the screen frame F in order to secure the screen mesh M to the screen frame F in normal fashion. As more spline 42 is needed, a simple pull on the spline 42 causes the spool 44 to rotate and payout additional spline 42 to the worker W. As the axle 50 is within the bulbous end 24 of each channel 18 and below the relatively narrow neck 22, the potential to accidentally cause the axle 50 to be discharged from the channels 18 is small due to the relatively large force needed to pass the axle 50 through the narrow neck 22.

This system allows the worker W to pull on the spline 42 in normal working fashion and thereby have sufficient spline 42 fed, without the need to turn to the payout mechanism 12 or otherwise concentrate or spend time retrieving additional spline 42. As the worker W only exerts sufficient pulling force on the spline 42 as is needed to feed the spline 42 into the screen groove G, the chances of a runaway despooling of the spline 42 from the spool 44 are minimized. However, if the worker W does find that too much spline 42 despools for a given tug by the worker W, then the brake mechanism 28 is used such that the knob 34 is rotated until the brake pad 30 contacts its respective end plate 46 of the spool 44 and exerts sufficient frictional force upon the plate 46 so as to slow rotation of the spool 44.

When the worker W is finished with a particular job, the end of the spline 42 is positioned within the notch 40 of one of the spline retainers 36 in order to hold the spline 42. Additionally, the worker W may further rotate the knob 34 of the brake mechanism 28 in order to more fully brake the rotation of the spool 44 so that spline 42 is not inadvertently paid out and possibly damaged during transport of the spool-laden payout mechanism 12 between jobs. The worker W carries the payout mechanism 12 to the next job via the handle 26.

While the invention has been particularly shown and described with reference to an embodiment thereof, it will be appreciated by those skilled in the art that various changes in form and detail may be made without departing from the spirit and scope of the invention.

I claim:

1. A method for paying out spline during a screening process, the method comprising the steps of:

providing a payout mechanism that has a base, a pair of upright and coextensive standards extending upwardly from the base, each standard having a first face and an opposing second face such that the two first faces face one another, each standard having a channel disposed within the standard's first face and not extending through to the second face, the channel on one standard being parallel with and facing the channel on the other standard wherein each channel has an opening that tapers into a neck portion and thereafter expands into a bulbous end such that the axle rests within the bulbous end of each channel;

providing a spool having a pair of end plates joined by a hollow core such that the hollow core is disposed completely between the pair of end plates and such that the spool has a length of the spline wound thereabout;

providing a first post that has a first notch, the first notch being of a first size;

securing the first post to the base in upright fashion;

frictionally placing a portion of the spline within the first notch in order to hold the spline within the first notch;

providing an axle and impaling the axle through the hollow core and receiving the axle within the channels of the standards; and exerting a pulling force on the spline so as to cause the spool to rotate about the axle and thereby payout a portion of the spline from the spool.

2. The method as in claim 1 further comprising the steps of:
providing a handle; and
extending the handle between the pair of standards.

3. The method as in claim 1 further comprising the steps of:
providing a brake mechanism; and
attaching the brake mechanism to one of the standards such that the brake mechanism retards rotation of the spool about the axle.

4. The method as in claim 3 wherein the brake mechanism comprises a brake pad that has a shaft extending therefrom, the shaft threadably passing through the standard upon which the brake mechanism is located, and a knob located on the shaft such that rotation of the knob causes the brake pad to advance toward an end plate of the spool and frictionally engage this end plate and counterrotation of the knob causes the brake pad to retreat away from this end plate.

5. The method as in claim 1 further comprising the steps of:
providing a second post that has a second notch, the second notch being of a second size that is different relative to the first size;
securing the second post to the base in upright fashion in spaced apart fashion relative to the first post; and
frictionally placing a portion of the spline within the second notch in order to hold the spline within the second notch.

6. A payout mechanism comprising:
a base having a pair of upright and coextensive standards extending upwardly from the base, each standard having a first face and an opposing second face such that the two first faces face one another, each standard having a channel disposed within the standard's first face and not extending through to the second face, the channel on one standard parallel and facing the channel on the other standard;
a spool having a pair of end plates joined by a hollow core such that the hollow core is disposed completely between the pair of end plates and such that the spool has a length of a spline wound thereabout;
an axle that is impaled through the hollow core with the axle thereafter being received within the channels of the standards;
a first post that has a first notch of a first size, the first post extending upwardly from the base such that whenever a portion of the spline is frictionally received within the first notch, the spline is held thereat;
a brake mechanism that is attached to one of the standards such that the brake mechanism retards rotation of the spool about the axle and comprises
a brake pad,
a shaft extending from the brake pad and threadably passing through the standard upon which the brake mechanism is located, and
a knob located on the shaft such that rotation of the knob causes the brake pad to advance toward an end plate of the spool and frictionally engage this end plate and counterrotation of the knob causes the brake pad to retreat away from this end plate; and
wherein whenever a pulling force is exerted on the spline, the spool rotates about the axle and thereby pays out a portion of the spline from the spool.

7. The payout mechanism as in claim 6 further comprising a handle that extends between the pair of standards.

8. The payout mechanism as in claim 6 wherein each channel has an opening that tapers into a neck portion and thereafter expands into a bulbous end such that the axle rests within the bulbous end of each channel.

9. The payout mechanism as in claim 6 further comprising a second post that has a second notch of a second size that is different relative to the first size, the second post extending upwardly from the base in spaced apart fashion relative to the first post such that whenever a portion of the spline is frictionally received within the second notch, the spline is held thereat.

10. A payout mechanism comprising:
a base having a pair of upright and coextensive standards extending upwardly from the base, each standard having a first face and an opposing second face such that the two first faces face one another, each standard having a channel disposed within the standard's first face and not extending through to the second face, the channel on one standard parallel and facing the channel on the other standard wherein each channel has an opening that tapers into a neck portion and thereafter expands into a bulbous end such that the axle rests within the bulbous end of each channel;
a spool having a pair of end plates joined by a hollow core such that the hollow core is disposed completely between the pair of end plates and such that the spool has a length of a spline wound thereabout;
an axle that is impaled through the hollow core with the axle thereafter being received within the channels of the standards;
a first post that has a first notch of a first size, the first post extending upwardly from the base such that whenever a portion of the spline is frictionally received within the first notch, the spline is held thereat; and
wherein whenever a pulling force is exerted on the spline, the spool rotates about the axle and thereby pays out a portion of the spline from the spool.

11. The payout mechanism as in claim 10 further comprising a handle that extends between the pair of standards.

12. The payout mechanism as in claim 10 further comprising a second post that has a second notch of a second size that is different relative to the first size, the second post extending upwardly from the base in spaced apart fashion relative to the first post such that whenever a portion of the spline is frictionally received within the second notch, the spline is held thereat.

\* \* \* \* \*